United States Patent [19]

Treffer

[11] Patent Number: 4,656,403

[45] Date of Patent: Apr. 7, 1987

[54] DIGITAL SPEED CONTROL CIRCUIT FOR A DC MOTOR

[75] Inventor: Gerhard Treffer, Taufkirchen, Fed. Rep. of Germany

[73] Assignee: Siemens Aktiengesellschaft, Berlin and Munich, Fed. Rep. of Germany

[21] Appl. No.: 832,674

[22] Filed: Feb. 25, 1986

[30] Foreign Application Priority Data

Mar. 21, 1985 [DE] Fed. Rep. of Germany ....... 3510244

[51] Int. Cl.$^4$ ............................................. H02P 5/16
[52] U.S. Cl. .................................. 318/341; 318/327; 318/439
[58] Field of Search ............... 318/313, 326, 327, 341, 318/599, 439

[56] References Cited

U.S. PATENT DOCUMENTS

| | | | |
|---|---|---|---|
| 4,066,941 | 1/1978 | Foster | 318/341 |
| 4,354,146 | 10/1982 | Tenmyo et al. | 318/313 |
| 4,513,232 | 4/1985 | Safiuddin | 318/341 |
| 4,523,134 | 6/1985 | Kinoshita et al. | 318/327 X |
| 4,584,507 | 4/1986 | Taylor | 318/327 |

Primary Examiner—Benjamin Dobeck

[57] ABSTRACT

A speed control circuit provides control acceleration or deceleration with respect to a rate of speed or to standstill and is effected for a DC motor by way of a processor system which is provided with a speed signal proportional to the speed of the DC motor. During the acceleration or deceleration phase, the pulse duration of the speed signal has a path-dependent control criterion assigned thereto. During operation at constant speed, the pulse duration has a control criterion corresponding to a rated speed assigned thereto. Further, a switching device is provided by way of which the value or, respectively, the mean value and the direction of the current through the DC motor can be set on the basis of the control criterion.

3 Claims, 3 Drawing Figures

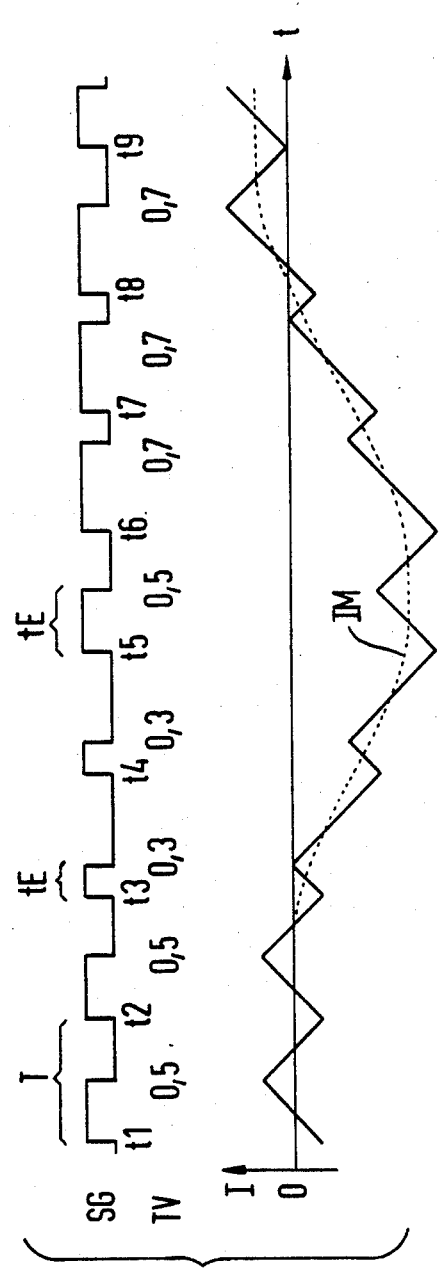

DIGITAL SPEED CONTROL CIRCUIT FOR A DC MOTOR

BACKGROUND OF THE INVENTION

1. Field of the Invention

The present invention relates to a speed control circuit for a DC motor comprising a pulse transmitter which emits a binary speed signal proportional to the speed of the DC motor.

2. Description of the Prior Art

In printer facilities, for example, the printer carriage is driven by a DC motor. Given standard speed control circuits for DC motors in printer drives, the speed control occurs via the armature voltage by way of analogously operating voltage control circuits. The actual speed is thereby converted into a speed-proportional voltage by a pulse transmitter connected to the motor shaft and by a frequency-to-voltage converter. The speed-proportional voltage is compared to a reference voltage which corresponds to the desired speed and the voltage difference is employed for controlling the armature voltage.

Other speed control circuits which have previously been proposed employ phase-locked loops for controlling the armature current. The actual speed of the DC motor is thereby acquired by a pulse transmitted connected to the motor shaft and is compared to a reference frequency which corresponds to the desired speed. The phase difference thereby arising is employed for controlling the armature current.

In these speed control circuits, a controlled acceleration up to a constant speed or, respectively, a controlled deceleration down to standstill is not provided. The start-up or, respectively, braking path which is subject to very pronounced errors due to frictional and voltage fluctuations was thereby dimensioned such that the electromotive force assures reliable operation given unfavorable friction and a generational braking effect.

SUMMARY OF THE INVENTION

The object of the present invention is to provide a speed control circuit by way of which a control acceleration up to the rated speed or, respectively, a controlled deceleration down to standstill is effective for a DC motor.

The above object is achieved, according to the present invention, in a speed control circuit for a DC motor which comprises a pulse transmitter which emits a binary speed signal proportional to the speed of the DC motor. The speed control circuit is particularly characterized by an evaluation and control stage which, during operation at constant speed, identifies a first difference between the value of the pulse duration of the speed signal and a stored reference value corresponding to a rated speed, which generates a first control signal from the first difference and which, during the accelerating or, respectively, decelerating phase, identifies a plurality of pulses of the speed signal which identifies a second difference between the value of the pulse duration and the speed signal and a path-dependent reference value stored in tabular form which is defined by the plurality of pulses, and by a switch device by way of which the value or, respectively, the mean value and the direction of a current through the DC motor can be set on the basis of the control signal.

The acceleration or, respectively, retardation values are prescribable given a speed control circuit of the present invention. As a consequence, the acceleration and retarding forces can be limited for the DC motor. This has an advantageous effect on the service life and reliability of the drive mechanism when the DC motor is employed for driving a printer carriage.

The control of the start-up and of the braking reduces the great fluctuations of the start-up or, respectively, braking path such as produced by friction and voltage fluctuations. The printer dimensions can be diminished, since the start-up and braking path tolerances elicited by the friction and voltage fluctuations are suppressed.

As a consequence of the controlled start-up or, respectively, braking in the speed control circuit constructed in accordance with the present invention, the peak powers required by the power supply can be reduced.

Given the utilization of the speed control circuit constructed in accordance with the present invention, smaller and less expensive DC motors can be employed for the printer drive.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a pulse diagram to aid in understanding the control of a DC motor.

DESCRIPTION OF THE PREFERRED EMBODIMENTS

Figure 1:
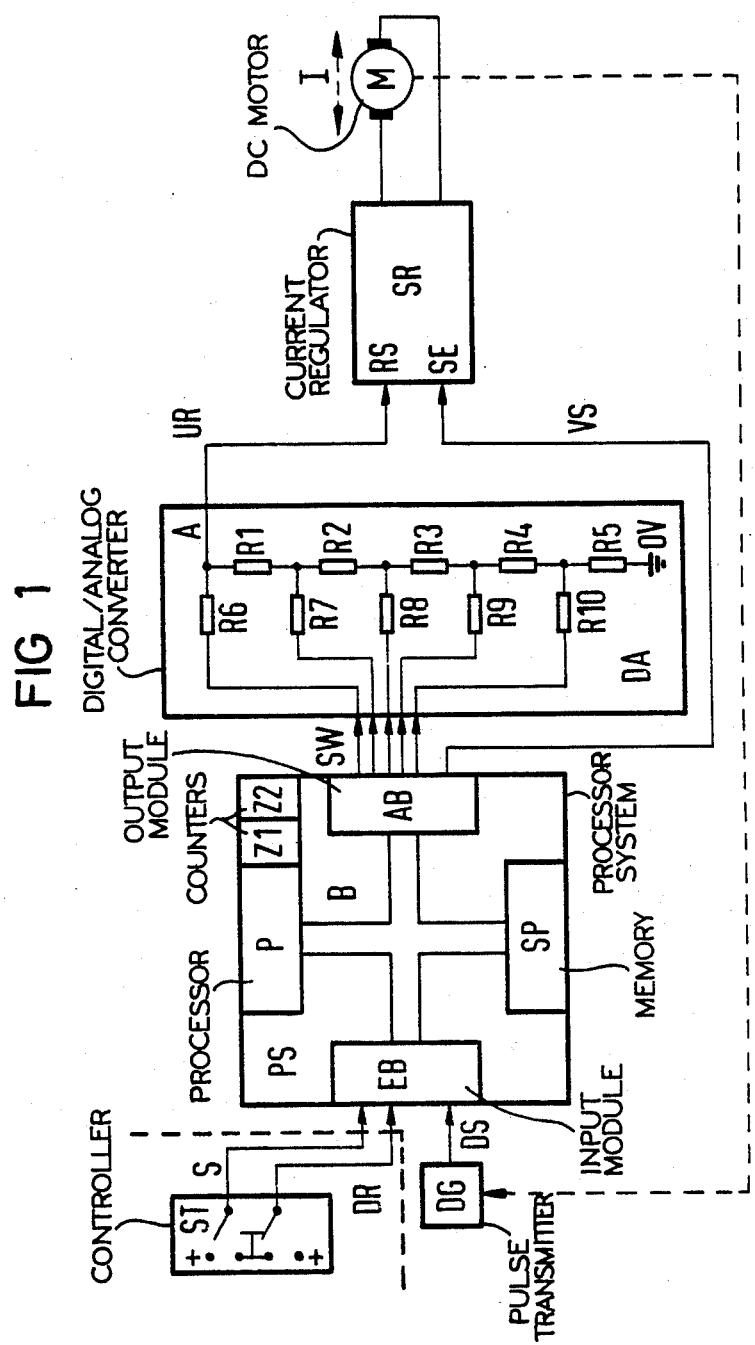
FIG. 1 is a schematic representation of an exemplary embodiment of a speed control circuit constructed in accordance with the present invention and comprising a current regulator.

FIG. 1 illustrates a controller ST which, for example, is a component of a line printer device. The controller ST comprises two switches (not referenced in detail) which are relevant in the context of the present invention. The controller ST emits a binary start-stop signal S and a rotational sense signal DR to the speed control circuit via the switches. The speed control circuit contains a DC motor M having an armature by way of which a pulse transmitter DG is driven, this outputting a speed signal DS. The pulse transmitter DG is essentially a tachometer and is composed, for example, of a slotted disk secured to the armature and of a light barrier for sensing the slots. Embodiments of pulse transmitters are described in the publication "Technische Mitteilung aus dem Bereich Bauelemente", Integrierte Drehzahlregelschaltung TCA 955, pp. 18 and 19 published by the Siemens Company. The pulse sequence of the binary speed signal DS output by the pulse transmitter DG is proportional to the rotational speed of the DC motor M. The slotted disk of the pulse transmitter DG is designed, for example, such that the light-transmissive and light-impermeable regions sensed by the light barrier are equal to one another. It is thereby guaranteed that the pulse sequence of the signal edges of the speed signal DS is proportional to the rotational speed of the DC motor M.

The speed signal DS output by the pulse transmitter DG is applied to an input module EB of a processor system PS which further contains a processor P comprising counters Z1, Z2, a memory SP and an output module AB which are interconnected via a bus B. The processor system PS is a microprocessor system which comprises a time/event counter (the counter Z1) and is realized, for example, by the module μP D 7811 manufactured by NEC Electronics GmbH.

In the processor system PS, a control word SW and an operational sign signal VS are determined from the speed signal DS. The value of a current I is set via the control word SW and the direction thereof in the DC motor M is set via the operational sign signal VS.

To this end, the control word SW which, for example, is output via five lines by way of the output module AB is applied to a digital-to-analog converter DA. The digital-to-analog converter DA comprises an output A which is connected to a reference potential 0 V via a resistor chain composed of a plurality of resistors R1–R5. The output A and the voltage divider taps (not referenced in detail) between the resistors R1–R5 are connected in this sequence to the terminals of the output module AB via a plurality of resistors R6–R10, the control word SW being tapped at the output module AB. The more significant terminal is thereby connected to the output terminal A. The digital-to-analog converter DA generates a reference voltage UR from the control word SW.

The reference voltage UR output by the digital-to-analog converter DA is applied to a reference voltage input RS of a current regulator SR and the operational sign signal VS output by the output module AB is applied to a current direction input SE of the current regulator SR. The current regulator SR is realized, for example, by a module identified as a circuit PBL 3717 manufactured by the Rifa Company. The DC motor M is connected to the output (not referenced in detail) of the current regulator SR. The value of the current I can be set via the value of the reference voltage UR applied to the reference voltage input RS and the direction of the current I through the DC motor M can be adjusted via the polarity of the operational sign signal VS applied at the current direction input SE.

The manner of operation of the speed control circuit illustrated in FIG. 1 is set forth below.

The chronological spacing between the signal edges i.e. between the changes in the binary states of the speed signal DS output by the pulse generator DG, is inversely proportional to the speed of the DC motor M. After every change of the speed signal DS, the counter reading of the counter Z1 is read, whereby the counter Z1 is again started after a reset command. The counter Z1 counts the number of periods of an internal reference clock which lie between the signal edges. The counter reading is thereby also proportional to the speed of the DC motor M. It is of subordinate significance for the present invention whether the counter Z1 counts forward or backward. It must be assured, however, that the counter Z1 does not exceed its minimum or, respectively, maximum value between two changes of the speed signal DS.

The counter reading is subtracted from a reference value stored in the processor system PS, the reference value prescribing the rate of speed of the DC motor M. The value of the current through the DC motor M, i.e. the control word SW, is defined by the difference thereby identified. The direction of the current through the DC motor M, i.e. the polarity of the operational sign signal VS, is defined by the operational sign of the difference in combination with the rotational sense signal DR. The control word SW and the operational sign signal VS are output via the output module AB. The operational sign signal VS is directly connected to the regulator SR and the control word SW is transmitted to the current regulator SR via the digital-to-analog converter DA.

The control word SW can be deposited in tabular form in the memory SP of the processor system PS. In this case, the difference serves the purpose of addressing a control word SW. In another instance, the control word SW can be formed from the difference by a control algorithm.

The plurality of changes in the speed signal DS is registered in, for example, a further counter Z2.

The polarity of the operational sign signal VS is dependent on the rotational sense signal DR and on the fact whether the speed of the DC motor M lies above or below the rated speed.

During the start-up phase or, respectively, during the braking phase of the DC motor M, the acceleration or deceleration, respectively, is prescribed by a path-dependent reference value table written in the memory SP. The path-dependent reference value is defined by the counter reading of the counter Z2, this path-dependent reference value being respectively employed for forming the difference between the counter reading of the counter Z1 and this reference value. The path-dependency of the control word SW is thereby realized by the number of changes in the speed signal DS.

By way of logical combination in the processor system PS, the DC motor M is accelerated out of standstill in the desired rotational sense up to the rate of speed of the start-stop signal S output by the controller ST and the rotational sense signal DR or, respectively, is decelerated from the constant running at the reference speed down to standstill. The control event in the processor system PS is started by the start-stop signal S.

As a consequence of the prescribable, path-dependent reference value table, a control acceleration of retardation, respectively, can be set during the start-up or, respectively, braking phase of the DC motor M. The reference value remains constant during operation with constant speed.

Figure 2:
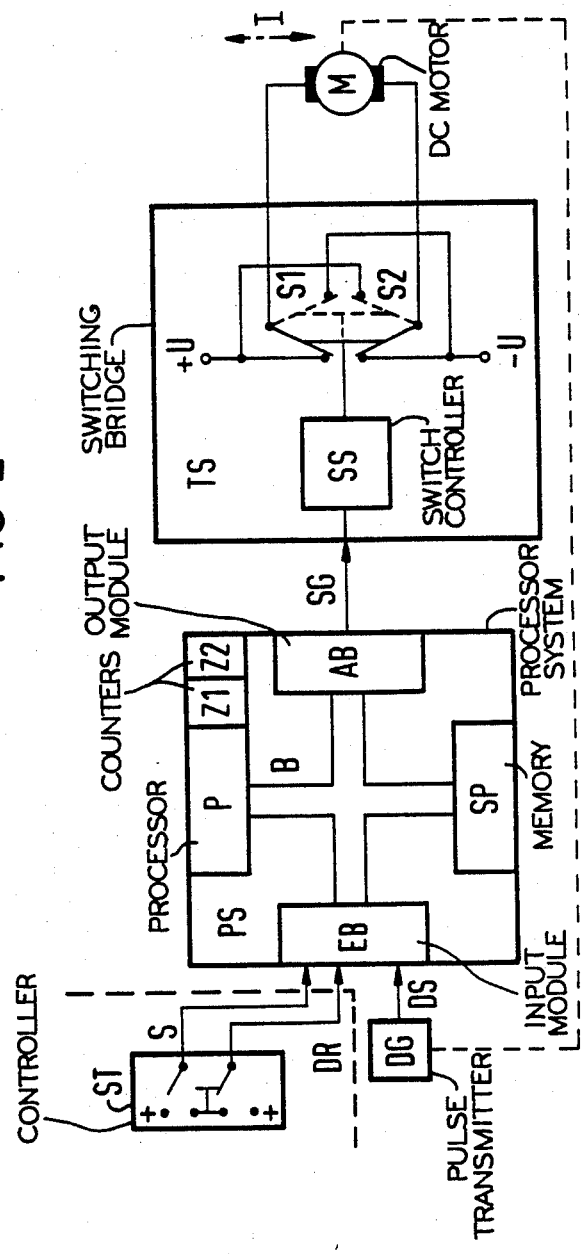
FIG. 2 is a schematic representation of another exemplary embodiment of a speed control circuit constructed in accordance with the present invention.

Some of the portions known from FIG. 1 are shown in a further exemplary embodiment of FIG. 2. In detail, these are the controller ST which forwards the start-stop signal S and a rotational sense signal DR to the processor system PS, and the DC motor M comprising a pulse generator DG coupled via the armature which forwards the rotary speed signal to the processor system PS.

The speed control circuit illustrated in FIG. 2 contains a known transistor switching bridge TS which comprises two switches S1 and S2 and a switch controller SS. The DC motor M can be connected between a positive voltage source +U and a negative voltage source −U via the switches S1 and S2. One of the voltage sources +U, −U can be a reference potential 0 V. The direction of the current I to the DC motor M can be set via the switch controller SS, i.e. via the two positions of the switches S1 and S2. The DC motor M is therefore operated with alternating current. The output module AB of the processor system PS forwards a control signal SG to the switch controller SS of the transistor switching bridge TS.

FIG. 3 illustrates the curve of the control signal SG with respect to time. The control signal SG respectively comprises a rising signal edge at the time t1–t9. The period duration T between two respective successive times is constant. The pulse duration tE of the pulse which respectively begins at one of the times t1–t9 is variable. The illustrated, digital pulse duty cycle TV of the control signal SG is defined by the quotient of the pulse duration tE and the period duration T.

FIG. 3 also shows the current I through the DC motor M dependent on the time t. A mean value IM of the current I is shown with a broken line. The mean value IM has a constant value when the pulse duty cycle TV of the control signal 0.5. When, departing from this value, the pulse duty cycle TV becomes smaller than 0.5, i.e. when the pulse duration tE is less than half the period duration T, then the mean value IM decreases. When the pulse duty cycle TV has a value greater than 0.5, i.e. when the pulse duration tE is more than half the period duration T, then the mean value IM increases.

The manner of operation of the speed control circuit illustrated in FIG. 2 is set forth hereinbelow.

Analogous to the speed control circuit disclosed in FIG. 1, a difference is also formed here from the changes in the speed signal DS via the counter reading of the counter Z1 and the subtraction from a reference value. The mean value of the current through the DC motor M, i.e. the pulse duration tE, is defined by this difference in combination with the rotational sense signal DR.

The pulse curve of the control signal SG output by the output module AB is defined, for example, by the rigidly prescribed period duration T and the pulse duration tE.

The dwell times of the switches S1 and S2 of the transistor switching bridge TS in their respective switch positions and, therefore, the mean value IM of the current through the DC motor M are therefore defined via the control signal SG.

By way of logical combination in the processor system PS, the DC motor M is accelerated from standstill up to the rate of speed in the desired rotational sense by the start-stop signal S output by the controller ST and the rotational sense signal DR or, respectively, is decelerated from constant running at the rate of speed down to standstill. The control event in the processor system PS is started by the start-stop signal S. The condition set forth with respect to the control word SW holds true, by analogy, for the pulse duty cycle TV or, respectively, for the pulse duration tE of the control signal SG.

The pulse duration tE is therefore formed via the difference between the reference value or, respectively, the path-dependent reference value and the counter reading of the counter Z1. This occurs either by addressing values of the pulse duration tE stored in tabular form or occurs by way of calculation with a control algorithm.

The pulse duty cycle TV or, respectively, the pulse duration tE additionally depends on the rotational sense signal DR and on the fact as to whether the speed of the DC motor M lies above or below the rate of speed. The pulse duty cycle TV, so to speak, contains the information of the control word SW and of the operational sign signal VS. A pulse duty cycle greater than 0.5 corresponds, for example, to a positive operational sign signal VS and a pulse duty cycle smaller than 0.5 corresponds to a negative operational sign signal VS. The value of the deviation from 0.5 thereby corresponds to the control word SW.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A speed control circuit for a DC motor having an armature, comprising:
    a pulse transmitter connected to and driven by the motor to produce a binary speed signal proportional to motor speed;
    evaluation and control means connected to said pulse transmitter, including storage means storing a reference value corresponding to a reference speed, and operable during constant speed of the motor to generate a first control signal as an output signal representing the difference between the pulse width of the binary speed signal and the stored reference value, the first control signal representing a desired current value and desired current direction through the armature;
    said storage means further storing reference values representing pluralities of the pulses of the binary speed signal, and said evaluation and control means operable during acceleration and deceleration to generate a second control signal as an output signal representing the difference between the pulse duration of the binary speed signal and a stored path-dependent reference value representing the plurality of pulses of the binary speed signal;
    switching means connected between said evaluation and control means and the motor and operable in response to the output signals of said evaluation and control means to set the current and current direction through the armature of the motor, the output signal comprising a control word and an operational sign signal, and said switching means comprising a digital-to-analog converter connected to said evaluation and control means to receive said control word and form a reference voltage, and a current regulator connected between said digital-to-analog converter and the motor and connected to receive the operational sign signal, said current regulator responsive to the reference voltage and the operational sign signal to set the current value and current direction for the motor.

2. The speed control circuit of claim 1, wherein:
    said storage means comprises means for storing the reference values in tabular form.

3. The speed control circuit of claim 1, wherein:
    said evaluation and control means comprises a processor system including said storage means and a timer/event counter and a clock, said counter operable to count periods of said clock between edges of signal changes of the binary speed signal to produce a counter signal representing and proportional to motor speed.

* * * * *